United States Patent [19]
Freedman et al.

[11] 3,867,260
[45] Feb. 18, 1975

[54] MASS TRANSFER CONDENSER, PARTICULARLY FOR USE WITH FERMENTING VESSELS

[75] Inventors: David Freedman; Richardo Sadir, both of Highland Park, N.J.

[73] Assignee: New Brunswick Scientific Co., Inc., New Brunswick, N.J.

[22] Filed: Mar. 13, 1972

[21] Appl. No.: 234,273

Related U.S. Application Data

[63] Continuation of Ser. No. 827,280, May 23, 1969, abandoned.

[52] U.S. Cl. ............. 202/185 E, 202/189, 165/111, 165/104, 165/165, 62/93
[51] Int. Cl. .................................. B01d 3/00, F28b
[58] Field of Search ........... 165/110, 111, 104, 164; 62/93, 272; 55/269; 202/185–193

[56] References Cited
UNITED STATES PATENTS

| | | | |
|---|---|---|---|
| 1,086,684 | 2/1914 | Molesworth | 202/185 D |
| 1,489,725 | 4/1924 | Wilson | 62/54 X |
| 1,584,671 | 5/1926 | Sleppy | 165/111 |
| 1,716,333 | 6/1929 | Vuilleumier | 165/104 |
| 3,344,852 | 10/1967 | Bergson | 165/110 X |
| 3,396,515 | 8/1968 | Wright | 55/269 |
| 3,453,809 | 7/1969 | Henderson | 165/111 X |
| 3,480,513 | 11/1969 | Martin | 202/185 |

FOREIGN PATENTS OR APPLICATIONS

| | | | |
|---|---|---|---|
| 620,650 | 5/1961 | Canada | 202/185 |
| 525,197 | 8/1940 | Great Britain | 165/104 M |

*Primary Examiner*—Albert W. Davis, Jr.
*Attorney, Agent, or Firm*—Blum Moscovitz Friedman & Kaplan

[57] ABSTRACT

A condenser, particularly for use with fermenting vessels, to condense liquid out of a moisture-carrying gas. An upper wall having a gaseous phase discharge defines part of an enclosure to receive a moisture-carrying gas from which the liquid phase is to be condensed. A lower wall is situated beneath the upper wall, also defines part of the enclosure, and serves not only to admit the moisture carrying gas to the enclosure but also to discharge the liquid condensate out of the enclosure.

A side wall extends between the upper and lower walls and defines the enclosure therewith. A tube within the enclosure receives a coolant and defines the path of flow of the coolant within the enclosure. A mass transfer packing is situated within the enclosure in engagement with the walls and also surrounding and engaging the tube so that heat transfer can take place between the packing and the tube as well as between fluids within the enclosure and the packing. This mass transfer packing is made up of a plurality of ceramic bodies of special configuration which act in a very effective manner to condense the liquid phase while assuring low pressure drop, a large exposed surface area, turbulence, and good internal liquid distribution.

1 Claim, 4 Drawing Figures

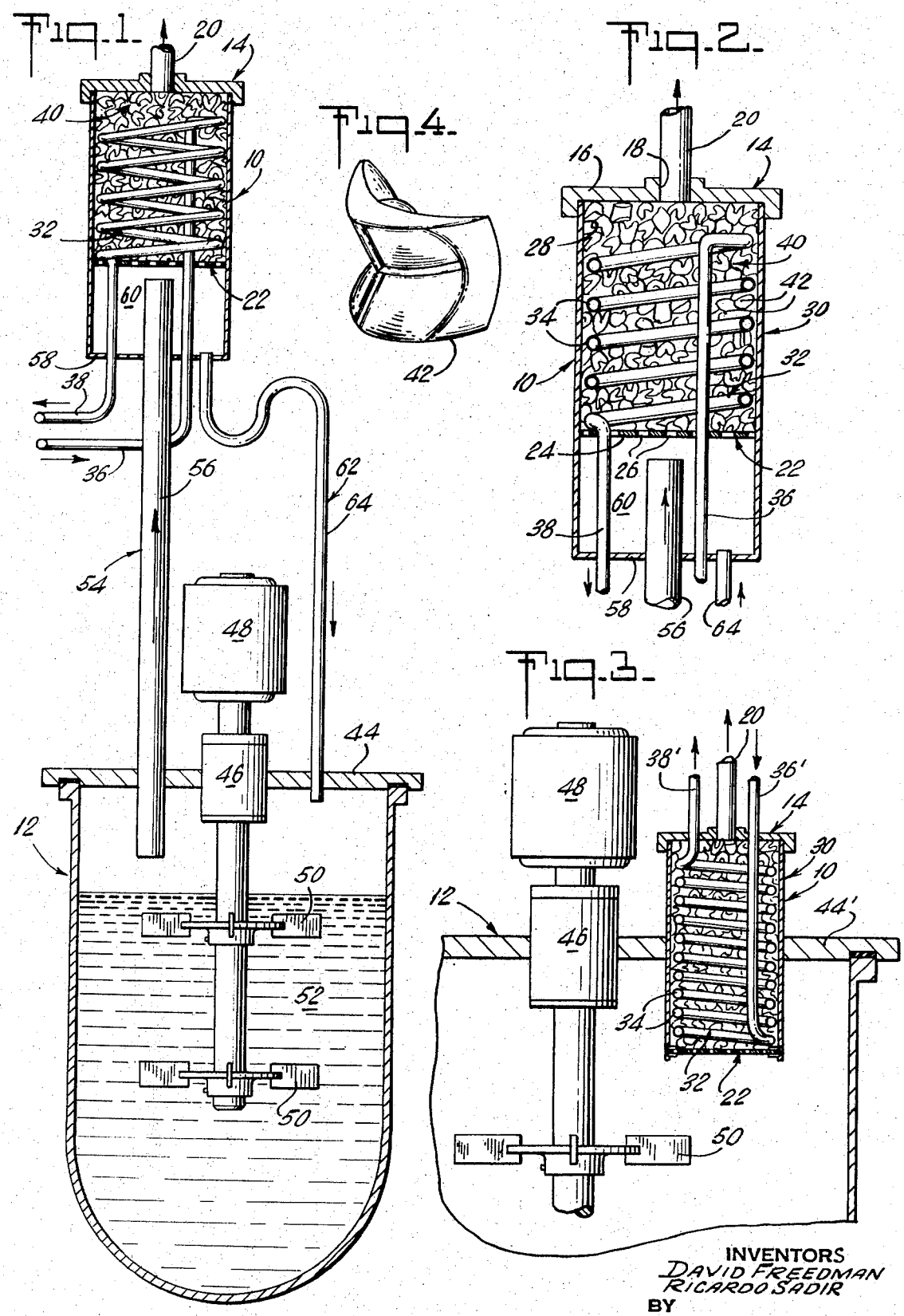

3,867,260

MASS TRANSFER CONDENSER, PARTICULARLY FOR USE WITH FERMENTING VESSELS

This is a continuation of application Ser. No. 827,280, filed May 23, 1969, now abandoned.

BACKGROUND OF THE INVENTION

The present invention relates to condensers.

In particular, the present invention relates to condensers to be used with devices such as fermentation vessels.

The present invention relates especially to condensers capable of condensing liquid out of a moisture-carrying gas even in those cases where there is a very high percentage of gas or volatile matter and a very low percentage of a liquid such as water.

When carrying out certain processes, such as a fermentation process, it is unavoidable that the treated liquid will form a foam. This foam is broken up within the fermentation vessel so that the liquid phase of the foam is returned to the liquid within the vessel while the gaseous phase can discharge out of the fermentation vessel. This gaseous phase, however, is not completely free of liquid and forms a moisture-carrying gas out of which the liquid should be condensed and returned to the fermentation vessel so as to assure maximum output.

At the present time it is not possible to achieve economically and efficiently condensation of liquid out of such a moisture-carrying gas. The known condensers are not capable of achieving the required heat transfer as well as maintaining a sufficiently low pressure drop and the required turbulence between the gaseous and liquid phases which will result in an economical efficient return of liquid out of the moisture-carrying gas.

SUMMARY OF THE INVENTION

It is accordingly a primary object of the present invention to provide a condenser capable of operating efficiently to extract liquid from a moisture-carrying gas particularly in the case where the liquid forms a relatively small fraction of the fluid which includes the gas and liquid.

In particular, it is an object of the invention to provide a condenser of the above type which is capable of effective use in connection with fermentation processes.

Also, it is an object of the invention to provide a consenser which has a rugged simple construction assuring proper operation over long life with minimum maintenance.

In particular, it is an object of the invention to provide a condenser capable of achieving a mass transfer of heat with such added advantages as low pressure drop, large active surface exposed per unit volume, complete utilization of surface for mass transfer, turbulent contact between phases, large number of interstitial transfer points per unit volume, and good internal liquid distribution characteristics.

According to the invention the condenser includes an upper wall means through which the gaseous phase of a moisture-carrying gas can discharge. This upper wall means defines part of an enclosure which is also defined in part by a lower wall means which is situated beneath the upper wall means for admitting the moisture-carrying gas to the enclosure as well as for discharging the liquid phase out of the enclosure. A side wall means extends between the upper and lower wall means to define the enclosure therewith, and a tubular means is situated within the enclosure for conducting a coolant along a given path in the enclosure. A mass transfer means is packed within the enclosure around the tubular means and in engagement with all of the wall means for providing a mass transfer of heat from a gas within the enclosure to the packed mass transfer means which is also in heat-exchanging relation with the tubular means to be cooled thereby. As a result, moisture is condensed out of the gas onto the packed mass transfer means to flow downwardly from the latter out through the lower wall means while the gaseous phase can discharge out through the upper wall means.

BRIEF DESCRIPTION OF DRAWINGS

The invention is illustrated by way of example in the accompanying drawings which form part of this application and in which:

FIG. 1 is a schematic sectional elevation of a condenser of the invention and a fermenting vessel operatively connected therewith;

FIG. 2 is a schematic sectional elevation of the condenser of FIG. 1 illustrated at an enlarged scale as compared to FIG. 1;

FIG. 3 shows another embodiment of the combination of a condenser of the invention with a fermenting vessel; and FIG. 4 is a perspective illustration of one of the bodies which form the mass transfer packing used in the condenser of the invention.

DESCRIPTION OF PREFERRED EMBODIMENTS

Referring now to the drawings, FIG. 1 illustrates a condenser 10 of the invention operatively connected with a fermenting vessel 12. The details of the condenser 10 are most clearly apparent from FIG. 2. Thus, referring to FIG. 2 the condenser 10 includes an upper wall means 14 in the form of an upper wall 16 formed with a central aperture 18 through which the gaseous phase of a moisture-carrying gas can discharge. For this purpose a discharge conduit 20 is operatively connected with the upper wall means 14 in the opening 18 thereof. The condenser 10 further includes a lower wall means 22 which is in the form of a flat plate 24 formed with a plurality of apertures 26 distributed throughout the plate 24. The upper wall means 14 and the lower wall means 22 define part of an enclosure 28 of the condenser 10. A side wall means 30 coacts with the upper wall means 14 and the lower wall means 22 in order to define the enclosure 28. The side wall means 30 may be cylindrical so that the upper and lower wall means are both circular. The lower wall means 22 functions to admit the moisture-carrying gas upwardly into the enclosure 28 while also functioning to discharge the liquid phase, which is condensed out of the gas, downwardly out of the enclosure 28.

A tubular means 32 is situated within the enclosure 28 for directing a coolant along a predetermined path in the enclosure 28. This tubular means 32 is in the form of a tubular coil 34 which extends substantially throughout the entire distance between the upper wall means 14 and lower wall means 22. The tubular means includes a supply portion 36 which in the case of FIGS. 1 and 2 supplies a coolant to the upper end of the coil 34, while a discharge portion 38 of the tubular means discharges the coolant out of the coil 34. This coolant may be any suitable fluid such as water at a suitably low temperature which enters through the inlet portion 36 to flow downwardly through the coil 34 and then out through the outlet portion 38 after having extracted heat from the interior of the enclosure 28.

Within the enclosure 28 is a mass transfer means 40 in the form of a plurality of bodies packed around the tubular means 32 as well as engaging the several wall means 14, 22, and 30. The mass transfer means serves to provide transfer of heat out of the moisture-carrying gas to condense the liquid phase out of the latter so that the gaseous phase can discharge out through the conduit 20 while the liquid phase will flow down through the apertures 26 of the lower wall means 22. The mass transfer means 40 is made up of a packing of bodies 42, one of which is shown in FIG. 4, which are haphazardly packed within the enclosure 28 so as to fill the latter while defining between the several bodies 42 spaces of haphazard configuration. The bodies 42 are chemically inert, unglazed and monabsorbent porcelain bodies having maximum exposed surface area and a minimum flow resistance. Thus, it is preferred to use for the bodies 42 ceramic Berl saddles which have the latter characteristics. As a result of the mass transfer means 40 it is possible to achieve in the condenser a maximum usable area for liquid and gas contact with minimum resistance to liquid and gas flow through the condenser. Thus, a mass transfer of heat between the fluid in the condenser and the packing 40 is achieved. With the illustrated arrangement there is a particularly low pressure drop with a large active surface exposed per unit of volume. A complete utilization of the surfaces available for mass transfer and at the same time turbulent contact between the gaseous and liquid phases is assured. The use of the bodies 42 in the packing which forms the mass transfer means 40 provides a large number of interstitial transfer points per unit volume with good internal liquid distribution characteristics. Thus, it is possible to economically use the condenser of the invention with a high degree of efficiency even in the case where there is a very high percentage of gas and a very low percentage of liquid.

In using the condenser 10 coolant is first directed through the tubular means 32 so as to be able to initiate the condensing operations. Throughout the operations sufficient coolant is directed through the tubular means to maintain the mass transfer means 40 at the required low temperature. Thus, the mass transfer means 40 will give up heat to the tubular means 32 to be carried away by the coolant therein.

On the other hand, because the mass transfer means 40 is maintained at a sufficiently low temperature, the moisture-carrying gas in the enclosure 28 has the liquid phase effectively condensed onto the bodies 42 of the packing 40, and in addition to their other characteristics referred to above these bodies 42 are of good wetability so that the condensed liquid readily flows down to and through the wall means 22. Thus, the gaseous phase devoid of the condensed moisture discharges out through the conduit 20.

This condenser structure of the invention is particularly suitable for use with fermenters. Thus, referring to FIG. 1, it will be seen that the fermenter vessel 12 is closed by a top wall 44 which through a suitable bearing assembly 46 carries a motor 48 which drives impellers 50. In this way the liquid 52 within the vessel 12 is treated and forms a foam providing a discharge of gas up through the supply conduit means 54. This supply of conduit means 54 is in the form of a tube 56 of relatively large diameter extending fluid-tightly through the wall 44 to communicate with the inner upper portion of the vessel 12 so that the moisture-carrying gas will flow up through the tube 56.

In the example of FIGS. 1 and 2 the side wall means 30 extends downwardly beyond the lower wall means 22 and terminates in a bottom edge to which a second lower wall means 58 is connected to form a second enclosure 60 beneath the enclosure 28. The supply conduit means 54 communicates with the interior of the enclosure 60 so that from the latter the moisture-carrying gas will be received in the enclosure 28. As is apparent from FIGS. 1 and 2 the supply and discharge tubular portions 36 and 38 pass through the lower wall 58. The condensed liquid phase forms a condensate which collects in the lower enclosure 60, and this condensate will flow through a return flow conduit means 62 back to the vessel 12. This return flow conduit means 62 is in the form of an elongated tube 64 arranged as indicated in FIG. 1 and having a top end communicating with a lower region of the enclosure 60 and a bottom end extending fluid-tightly through the wall 44 to communicate with the interior of the vessel 12. Thus, whatever condensate collects in the enclosure 60 will flow into the conduit 64 and eventually will be returned to the vessel 12.

The embodiment of the invention which is illustrated in FIG. 3 will achieve the same results as the embodiment of FIGS. 1 and 2 with even less structure. Thus, referring to FIG. 3, the vessel 12 is unchanged except that its top wall 44' is provided with an opening which receives the side wall means 30 in the manner shown in FIG. 3. It will be noted that in this case the top wall 44' is situated between the upper wall means 14 and the lower wall means 22 of the condenser 10 of the invention. Also, in the case of FIG. 3 the tubular means 32 still includes the coil 34, but the supply portion 36' and the return portion 38' of the tubular means extend through the top wall means 14 to provide a flow of coolant from the bottom toward the top of the enclosure 28 with this embodiment.

However, the important feature of this embodiment is that the apertured lower wall means 22 communicates directly with the interior of the vessel 12 to directly receive the moisture-carrying gas therefrom. Thus, the liquid phase which is condensed out of the gas will with this embodiment be received directly in the interior of the vessel 12 after passing through the lower wall means 22. It therefore is possible with the embodiment of FIG. 3 to provide a much more compact assembly with elimination of the supply conduit means 54 and return flow conduit means 62. However, this does require the direct mounting of the condenser 10 of the invention in the wall 44' which may under certain circumstances be an inconvenience particularly since the motor 48 and drive shaft for the impellers 50 should be centrally located. It is not always possible under these conditions to locate between the impeller driving assembly and the outer periphery of the vessel 12 a condenser 10 of sufficiently large size, so that the arrangement of FIG. 1 is to be preferred in many cases because of the ease with which the condenser assembly can be connected to the vessel when the condenser 10 is remote therefrom.

What is claimed is:

1. In a condenser, upper wall means for discharging out of an enclosure defined in part by said upper wall means for the gaseous phase of a moisture-carrying gas, lower wall means situated beneath and spaced from said upper wall means for admitting the moisture-carrying gas into said enclosure and for discharging the liquid phase of the moisture-carrying gas out of said enclosure, said lower wall means also defining part of said enclosure, uninsulated side wall means extending between said upper and lower wall means and surrounding said enclosure to define the latter together with said upper and lower wall means, tubular means situated within said enclosure for conducting a coolant along a predetermined path in said enclosure, said tubular means being in the form of a coil situated within said enclosure, spaced inwardly from said side wall means thereof, and extending substantially throughout the entire depth between said upper and lower wall means, said upper and lower wall means forming a pair of end wall means through at least one of which said tubular means extends into said enclosure while remaining entirely out of engagement with said side wall means, and mass transfer means packed in said enclosure around said tubular means and in engagement with all of said wall means, said tubular means extending through only one of said end wall means, and said tubular means including elongated supply and discharge portions extending through said one end wall means into said enclosure and respectively communicating with opposite ends of said coil, said supply portion of said tubular means extending along the interior of said enclosure from said one end wall means to the region of the other of said end wall means before communicating with one end of said coil while said discharge portion of said tubular means extends through only a relatively short distance beyond said one end wall means into said enclosure into communication with an adjoining end of said coil, so that coolant will first flow through substantially the entire depth of said enclosure along said supply portion of said tubular means before reaching one end of said coil and will then return along said coil toward said one end wall means before reaching said discharge portion of said tubular means, a fermenting vessel having a top wall formed with an opening through which said side wall means extends with said top wall being situated between said upper and lower wall means so that said lower wall means is situated within said fermenting vessel to receive directly therefrom a moisture-carrying gas from which liquid is to be condensed, whereby the condensed liquid will flow through said lower wall means directly back into said fermenting vessel.

* * * * *